(12) United States Patent
Okamoto et al.

(10) Patent No.: US 7,697,037 B2
(45) Date of Patent: Apr. 13, 2010

(54) IMAGE SIGNAL PROCESSING DEVICE AND METHOD

(75) Inventors: Kazuo Okamoto, Hirakata (JP); Tatsuro Juri, Osaka (JP); Yuji Nagaishi, Daito (JP); Takuma Chiba, Ibaraki (JP)

(73) Assignee: Panasonic Corporation, Osaka (JP)

( * ) Notice: Subject to any disclaimer, the term of this patent is extended or adjusted under 35 U.S.C. 154(b) by 1148 days.

(21) Appl. No.: 11/252,834

(22) Filed: Oct. 18, 2005

(65) Prior Publication Data

US 2006/0087565 A1  Apr. 27, 2006

(30) Foreign Application Priority Data

Oct. 21, 2004 (JP) ............................. 2004-306880
Jun. 1, 2005 (JP) ............................. 2005-161725

(51) Int. Cl.
H04N 5/228 (2006.01)
H04N 5/235 (2006.01)
H04N 3/14 (2006.01)

(52) U.S. Cl. ............... 348/222.1; 348/208.4; 348/221.1; 348/294

(58) Field of Classification Search ............... 348/14.15, 348/208.4, 221.1
See application file for complete search history.

(56) References Cited

U.S. PATENT DOCUMENTS

| | | | | | |
|---|---|---|---|---|---|
| 5,291,300 | A | * | 3/1994 | Ueda | ........................... 386/117 |
| 6,292,218 | B1 | * | 9/2001 | Parulski et al. | ........... 348/220.1 |
| 6,452,632 | B1 | * | 9/2002 | Umeda et al. | ............... 348/294 |
| 6,624,849 | B1 | * | 9/2003 | Nomura | ...................... 348/241 |
| 6,963,658 | B2 | * | 11/2005 | Hagihara et al. | ............ 382/107 |

FOREIGN PATENT DOCUMENTS

JP  2003-032556  1/2003

* cited by examiner

*Primary Examiner*—Luong T Nguyen
(74) *Attorney, Agent, or Firm*—RatnerPrestia

(57) ABSTRACT

When a method or apparatus of assuring simultaneous exposure, such as a mechanical shutter, is not provided with a MOS imaging sensor, moving subjects are distorted with a MOS image sensor when capturing a still image of a fast-moving subject because imaging and reading are not simultaneous across the MOS sensor. Changing the MOS sensor exposure sequence and reading sequence, and interpolating the read data, change and correct the read sequence line by line when imaging a high resolution moving image, and thus improve distortion in moving subjects.

5 Claims, 15 Drawing Sheets

IMAGE SIGNAL PROCESSING DEVICE AND METHOD

BACKGROUND OF THE INVENTION

1. Field of Technology

The present invention relates to a device and method for processing an image acquired by digital signal processing of an image signal output from a MOS (metal oxide semiconductor) imaging sensor for recording a high resolution still JPEG image, or a Motion JPEG, JPEG 2000, MPEG-1, MPEG-2, or MPEG-4, or H.263 or H.264 encoded video signal. More particularly, the invention relates to a digital camera, hand-held camera, or other mobile imaging device.

2. Description of Related Art

NMOS and CMOS image sensors are developing rapidly as the next-generation successor to CCD image sensors for applications in both video and still portable digital cameras, hand-held cameras, and cell phone cameras. One advantage of MOS sensors compared with CCD sensors is that MOS sensors do not have the signal transfer portion of a CCD device, and require only drive and sensing lines. MOS sensors will be expected to afford a larger photodiode aperture and hence a wider dynamic range. This gives MOS sensors a clear advantage as resolution increases. CCD sensors also require multiple power supply lines and wiring in order to handle signal transfer, while MOS sensors can use a single power supply line. MOS sensors offer the advantages of an extremely simple power supply and wiring design, and the incumbent lower cost.

Image signal processing in digital cameras, hand-held cameras, and cell phone cameras first writes the input signals from the CCD or MOS image sensor line by line to relatively inexpensive SDRAM (synchronous DRAM) for temporary storage. The input signals are written one line at a time pixel by pixel starting from the first sensor in line one. After the line one signals are written to memory, line 2 is written, then line 3, and so forth until all lines in one frame have been written to SDRAM.

The frame signal is then read from SDRAM for signal processing such as zooming in or out to enlarge or reduce the image. After this operation is completed, the signal is written to SDRAM again. The signal is then read for image signal compression and converted to a JPEG or other image compression format suitable for recording. The compressed image signal is then written again to SDRAM, and finally read from SDRAM by high speed DMA (direct memory access) control, for example, and transferred to an external nonvolatile storage device.

Signal processing for capturing a single still image from a digital still camera is described above. Recent digital cameras also typically feature a continuous exposure mode enabling capturing multiple still images in rapid succession.

When a CCD sensor is used with a mechanical shutter, all pixels in the CCD sensor are charged simultaneously to the shutter starting to open, and charging all pixels stops simultaneously to the shutter closing. This ability to simultaneously charge all pixels is one measure of imaging sensor performance.

Even when a mechanical shutter is not available as a means of assuring simultaneous charging of all pixels, if the charge is transferred to all pixels of the CCD sensor after exposure, the charge will not change even if the next exposure comes, and all charges detected by the CCD can be stored simultaneously at a known timing signal, thus assuring the synchronous operation of the CCD sensor.

MOS sensors, on the other hand, do not have the temporary charge storage capacity of a CCD sensor, and sensor charges are read sequentially pixel by pixel. As a result, there is a time lag between reading the first pixel and reading the last pixel. This is not a problem when capturing still images, but if there is movement in the subject image area, this time lag results in image distortion.

Various methods of solving this problem have been proposed. The simplest method is to provide a mechanical shutter to assure simultaneous exposure of all pixels when capturing still images. In this case the pixels are exposed simultaneously but read sequentially.

While a mechanical focal plane shutter that travels at the same speed as the exposure is used to produce a line by line exposure when the overall scene is dark, this focal plane shutter cannot provide sufficient exposure when the scene is bright. The overall scene is therefore exposed using a mechanical shutter and an on/off electronic shutter signal is generated to set the reset timing for each line, thereby achieving an electronic shutter with a wide dynamic range enabling exposure in low light situations. See Japanese Unexamined Patent Appl. Pub. 2003-32556.

The foregoing method is described further below.

FIG. 13 is a function block diagram of a camera enabling simultaneous exposure by a MOS sensor, and FIG. 14 is a flow chart showing the operation of this device. A conventional device assuring the simultaneous exposure by this MOS sensor is described first with reference to FIG. 13.

As shown in FIG. 13, this conventional digital camera has an imaging lens 50, an imaging element 51 for converting the optical signal from the imaging lens 50 to an electric signal, a signal processing unit 52, memory devices 53 and 54, a lens aperture drive unit 56 for driving the aperture of the imaging lens 50, a drive unit 55 for driving the imaging element, a lens information detector 58 for detecting such lens information as the position of the imaging lens, a central control unit 57, an operating unit 59 used by the operator, and a light color detector 60.

Operation of this camera is described next.

The imaging element 51 photoelectrically converts the optical signal from the imaging lens 50 to an electric signal. The converted signal is written by the signal processing unit 52 to memory devices 53 and 54. The lens aperture drive unit 56 controls the aperture of the imaging lens 50. The drive unit 55 that drives the imaging element 51 is controlled by the central control unit 57, and the delay between when the first drive signal is applied to when the second drive signal is applied differs between pixels. The timing of applying the first drive signal and the timing of applying the second drive signal varies pixel by pixel.

An algorithm for preventing subject distortion when the flash is not used, and for image stabilization to improve blurring due to hand shaking is shown in FIG. 14.

The lens to subject distance is measured first (#405). The exposure time is then determined by the subject brightness measurement step (#410). The part of the image area to be captured is then determined by the main subject detection step (#415). The exposure area is then determined by the exposure area selection step (#420). Photoelectric conversion then starts in the photoelectric conversion starting step (S1) (#425). Operation then waits for photoelectric conversion to end in the photoelectric conversion step (#430). When photoelectric conversion ends, the decoded signal is output in the start of decoded signal output step (S2) (#435). This process extracts the subject part of the image area and minimizes distortion in a moving subject.

PROBLEM TO BE SOLVED

Because the charge accumulation area in the prior art described above is two-dimensional, the aperture area of the photodiode for each pixel is narrowed, thus reducing one of the benefits of a MOS sensor, that is, high resolution with a high dynamic range.

The method of detecting the moving subject is also poorly described in the method described in Japanese Unexamined Patent Application Publication 2003-32556.

SUMMARY OF THE INVENTION

The present invention is therefore directed to solving the foregoing problems, and an object of this invention is to provide a means for efficiently extracting a moving subject and efficiently detecting the subject area, while also providing a method of reducing distortion in a moving subject when capturing a still image of a moving subject without reducing the dynamic range of the MOS sensor.

First, the present invention provides a means of changing the read sequence in each vertical line, and correcting interlacing line by line after temporarily saving to memory. Second, the present invention provides a means of dividing the image area into blocks, detecting the area containing the moving subject in each block, and exposing and read said areas with priority.

A first aspect of the present invention is an image signal processing device comprises: an image sensor; a vertical line control unit operable to control a vertical line access in said image sensor; a signal processing unit operable to specify an access sequence to said vertical line control unit; a vertical line data reading unit operable to read vertical line data from said image sensor; a vertical moving subject line detection unit operable to detect vertical lines containing moving subject data from the data read from said vertical line data reading unit; and a vertical line correction unit operable to correct the read vertical moving subject lines.

Thus comprised, the image signal process device reduces distortion in moving images imaged by the MOS sensor.

An image signal processing device according to a second aspect of the present invention comprises: an image sensor; a horizontal pixel control unit operable to control a horizontal pixel access in said image sensor; a signal processing unit operable to change and specify an access sequence to said horizontal pixel control unit; a horizontal pixel data reading unit operable to read horizontal pixel data from said image sensor; a horizontal moving subject pixel detection unit operable to detect horizontal pixels containing moving subject data from the data read from said horizontal pixel data reading unit; and a horizontal pixel correction unit operable to correct the read horizontal moving subject pixels.

Thus comprised, the image signal process device reduces distortion in moving images imaged by the MOS sensor.

An image signal processing device according to a third aspect of the present invention comprises: an image sensor; an area control unit operable to control an access to an area containing a plurality of vertical lines and a plurality of horizontal pixels in said image sensor; a signal processing unit operable to specify an access sequence to said area control unit; an area data reading unit operable to read data in said specified area of the image sensor; a moving subject area detection unit operable to detect an area containing a moving subject from the data read from said area data reading unit; and an area correction unit operable to correct the read moving subject area.

Thus comprised, the image signal process device reduces distortion in moving images imaged by the MOS sensor.

Preferably, the horizontal pixel control unit is operable to change the horizontal pixel read sequence within an area.

Preferably, the horizontal pixel control unit is operable to select every N-th horizontal pixel, where N is a positive integer.

Preferably, the vertical line control unit is operable to select every M-th vertical line, where M is a positive integer.

Preferably, the area control unit for determining a plurality of vertical lines and a plurality of horizontal pixels is operable to select every Mk vertical lines (where Mk is a positive integer) in every vertical area k (where k is a positive integer).

Preferably, the area control unit for determining a plurality of vertical lines and a plurality of horizontal pixels is operable to select every Np horizontal pixels (where Np is a positive integer) in every horizontal area p (where p is a positive integer).

Preferably, when a plurality of moving subjects are present in a scene and a plurality of vertical line groups containing a moving subject are present in a scene, said vertical line control unit is operable to first read the vertical line groups containing the moving subjects, and then read the vertical line groups not containing a moving subject.

Preferably, when a plurality of moving subjects are present in a scene and a plurality of area groups containing a moving subject are present in a scene, said area control unit, when controlling accessing to the area containing a plurality of vertical lines and a plurality of horizontal pixels in said image sensor, is operable to first read the area groups containing the moving subjects, and then read the area groups not containing a moving subject.

A fourth aspect of the present invention is an image signal processing method comprising: controlling a vertical line access in an image sensor; specifying a sequence for accessing vertical lines; reading vertical line data; detecting vertical lines containing moving subject data in the read vertical line data; and correcting the read vertical moving subject lines.

A fifth aspect of the present invention is an image signal processing method comprising: controlling a horizontal pixel access in an image sensor; specifying a sequence for accessing the horizontal pixels; reading horizontal pixel data; detecting horizontal pixels containing moving subject data from the read horizontal pixel data; and correcting the read horizontal moving subject pixels.

A sixth aspect of the present invention is an image signal processing method comprising: controlling an area access in an image sensor; specifying an area containing a plurality of vertical lines and a plurality of horizontal pixels; specifying an access sequence to the area; reading data in the specified area; detecting an area containing a moving subject in the read area; and correcting the read moving subject area.

Preferably, the image sensor is a MOS image sensor.

Preferably, the vertical line control unit is operable to change the vertical line read sequence within an area.

Preferably, the area control unit is operable to change the area read sequence within an image.

EFFECT OF THE INVENTION

The particular effect of the present invention is reducing distortion in a moving subject in a still image of the moving subject captured by a MOS sensor.

Other objects and attainments together with a fuller understanding of the invention will become apparent and appreci-

DESCRIPTION OF THE PREFERRED EMBODIMENTS

Preferred embodiments of the present invention are described below with reference to the accompanying figures.

Embodiment 1

Figure 1:
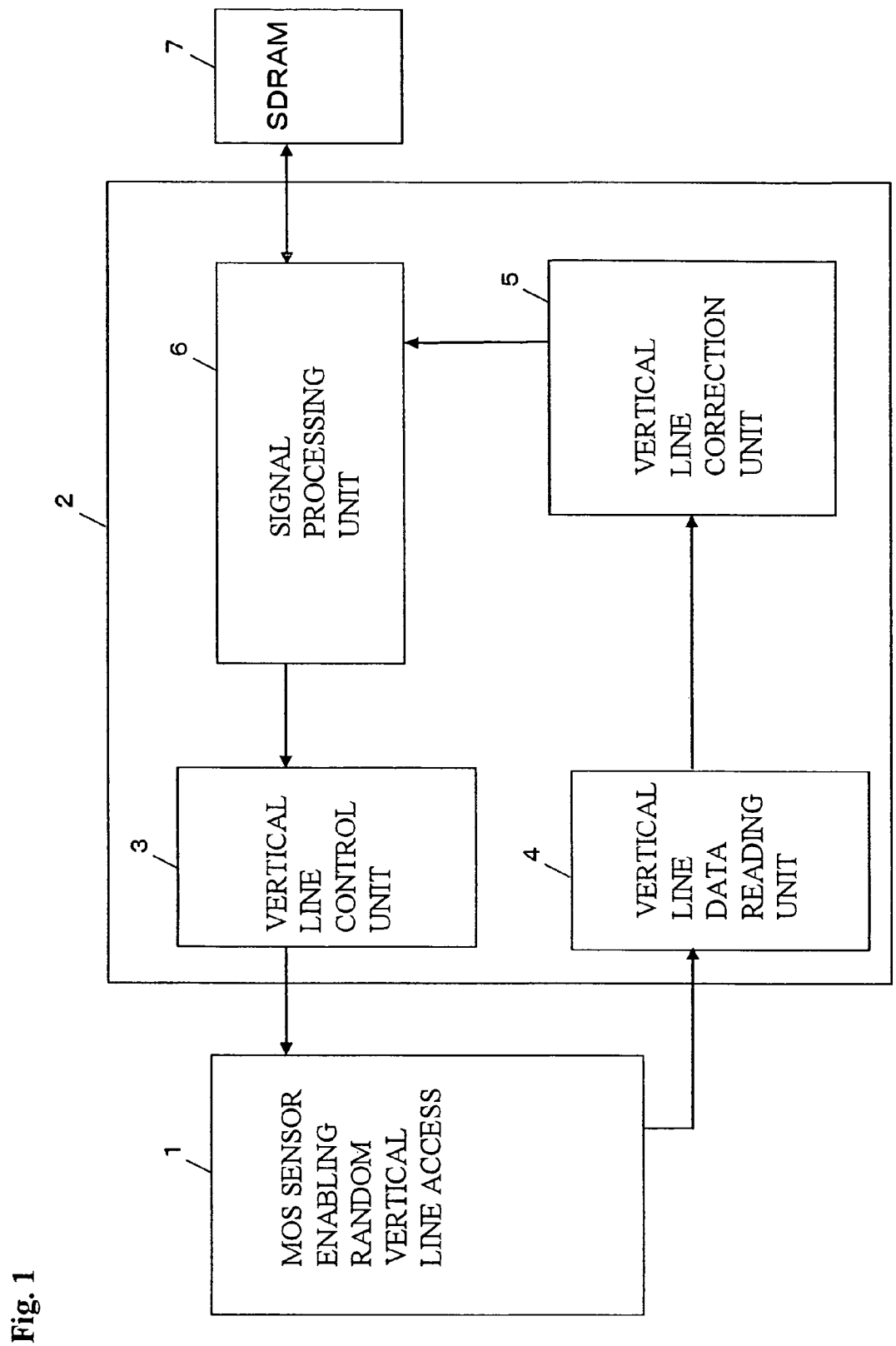
FIG. 1 is a block diagram of an imaging processor according to a first embodiment according to the present invention.

FIG. 1 is a block diagram of a preferred embodiment of the present invention. Imaging control according to the present invention is described below with reference to use in a digital camera, the components of which are described below.

An image signal processing device according to the present invention has a MOS sensor 1 enabling random vertical access, a signal processing block 2, and SDRAM 7. The signal processing block 2 includes a vertical line control unit 3, vertical line data reading unit 4, vertical line correction unit 5, and signal processing unit 6. Unlike a CCD sensor, the MOS sensor 1 is an asynchronous imaging element.

The function of each part is described next.

The MOS sensor 1 has a plurality of picture elements (pixels) arrayed in horizontal and vertical rows. The pixels in the horizontal rows are referred to as "horizontal pixels." The group of multiple horizontal pixels arranged along one horizontal line is referred to as a "vertical line." These lines are called vertical lines because they are adjacent to each other in the vertical direction. The MOS sensor 1 thus has a plurality of vertical lines arranged in the vertical direction. The photoelectric charges accumulated in each pixel are also read by vertical line unit. The vertical line control unit 3 determines the order in which the charges are read from the vertical lines. As described more fully below, the vertical line control unit 3 can change sequence in which the vertical lines are read frame by frame. The multiple horizontal pixels on each vertical line can also be read all at once simultaneously from one vertical line, or sequentially in the order determined by the horizontal sensing unit described below. Furthermore, it is possible to read every other pixels, or every i other pixels (i is a positive integer). Reading a pixel is called "pixel sensing."

The MOS sensor 1 enabling randomly accessing vertical lines (the random vertical line access MOS sensor of the claims, referred to below as simply MOS sensor 1) has a function for changing the MOS sensor 1 access sequence. The signal processing block 2 has a signal processing function for recording the read data sequentially to SDRAM 7. The vertical line control unit 3 has a function for controlling reading a desired vertical line. The vertical line data reading unit 4 has a function for reading the vertical line data specified by the vertical line control unit 3 from the MOS sensor 1. The vertical line correction unit 5 has a function for correcting the interlacing of the vertical line data read by the vertical line data reading unit 4. The SDRAM 7 temporarily stores the data from the signal processing unit 6, and is used as working memory for signal processing operations.

Operation of this embodiment is described next.

Figure 2:
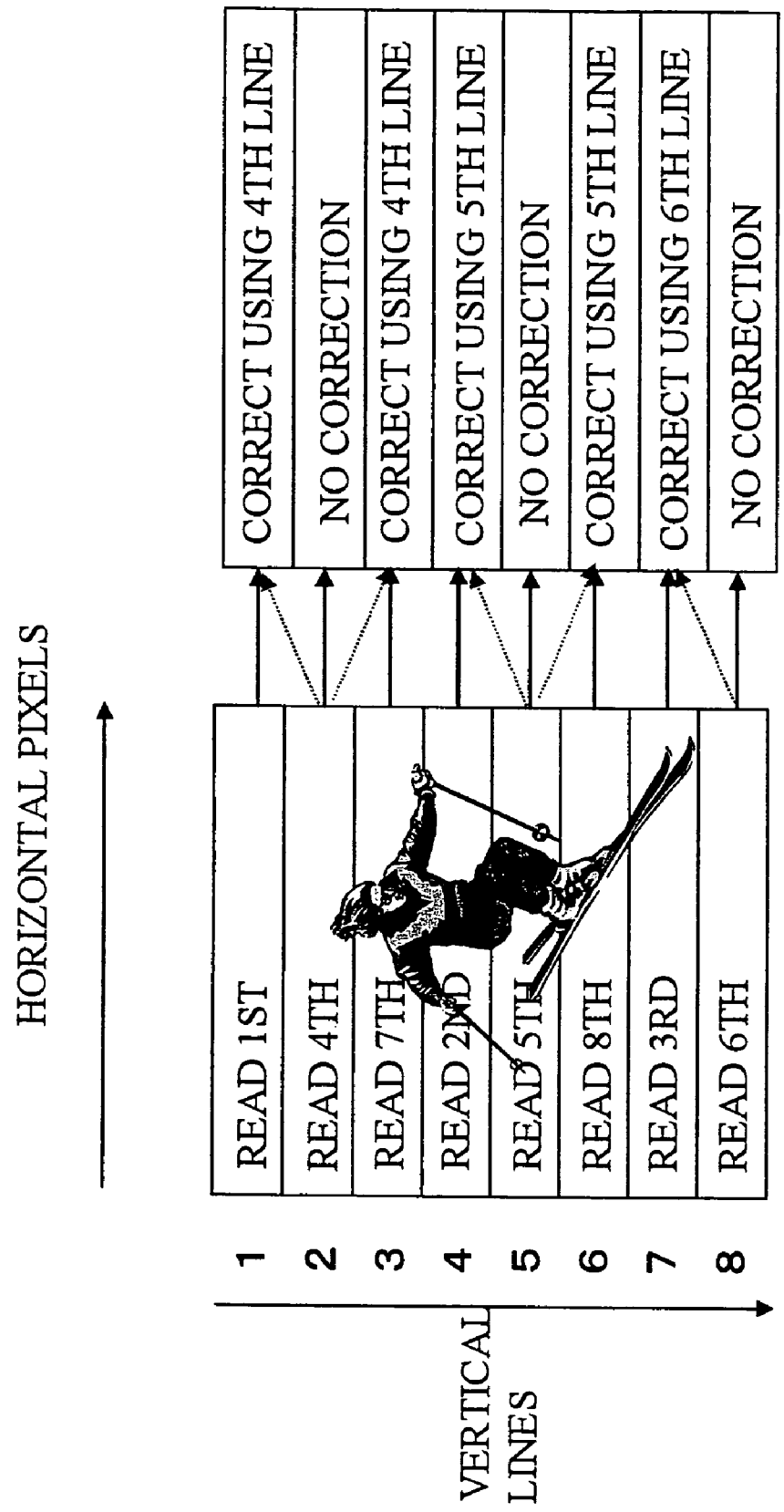
FIG. 2 describes the operation of an imaging process according to a first embodiment according to the present invention.

FIG. 2 illustrates the operating algorithm used for the operation of this first embodiment of the invention. The vertical lines are read by skipping a specified number of vertical lines. This skipped reading operation is described below.

The vertical line control unit 3 controls the sequence in which vertical lines are read from the MOS sensor 1 as follows. Line 1 is read first, the next two lines are then skipped and line 4 is read second, the next two lines are then skipped and line 7 is read third. Next, line 2, which is immediately below line 1, is read fourth, the next two lines are then skipped and line 5 is read fifth, and the next two lines are then skipped and line 8 is read sixth. Reading then cycles back to the next line immediately below line 2 so that line 3 is read seventh, and the next two lines are then skipped and line 6 is read eighth.

The vertical line data is passed by the vertical line data reading unit 4 to the vertical line correction unit 5. As shown in FIG. 2, the vertical line correction unit 5 corrects the data in line 1, which was read first from the MOS sensor 1, using the data from line 2, which was read fourth. The data from line 2, which was read fourth, is not corrected. The data from line 3 (read seventh) is then corrected based on the data from line 2 (read fourth). The data from line 4 (read second) is corrected using the data from line 5 (read fifth). The data in line 5 (read fifth) is not corrected. The data in line 6 (read eighth), is corrected based on the data from line 5 (read fifth). The data in line 7 (read third) is corrected using the data in line 8 (read sixth). The data in line 8 (read sixth) is not corrected. The data in line 9 (read ninth) is corrected based on the data in line 8 (read sixth).

By thus interlacing the data every three lines, the signal processing unit 6 corrects interlacing using data from temporally successive vertical lines.

Linear interpolation, cubic interpolation, or bilinear interpolation can be used as the correction method.

Figure 15:
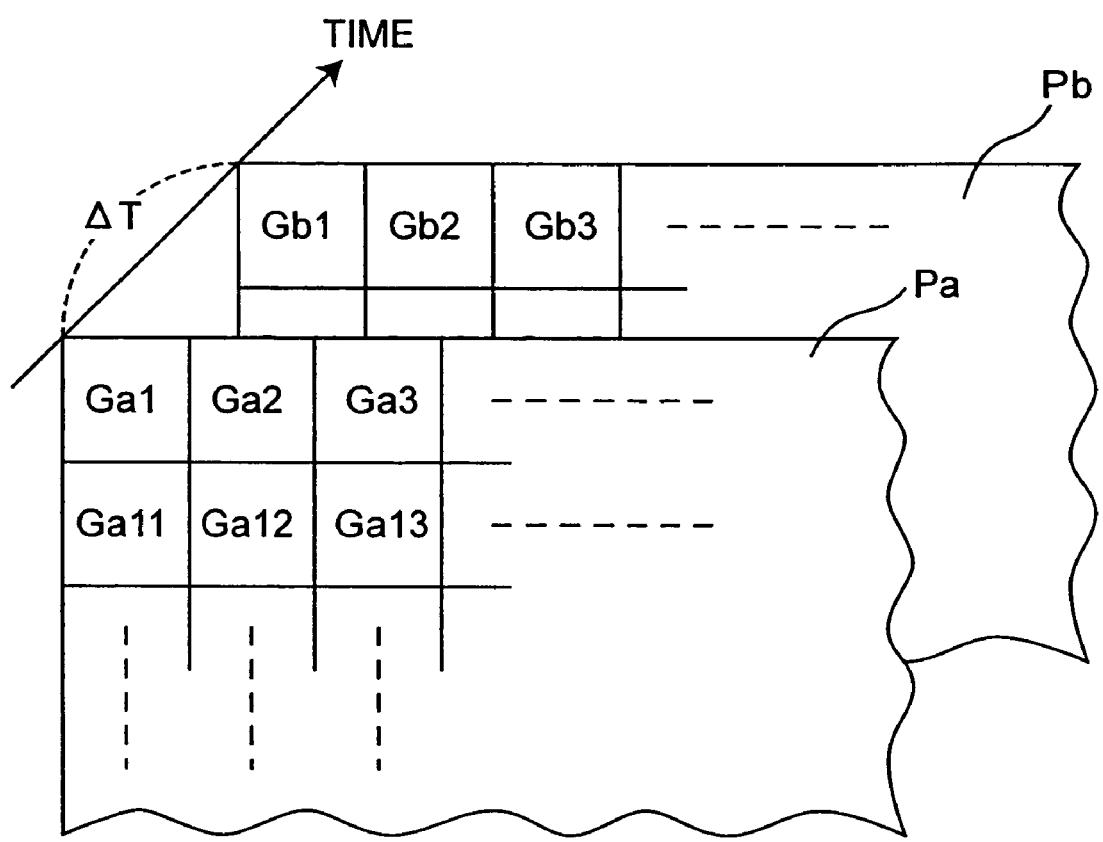
FIG. 15 is a descriptive diagram showing the pixels in a plurality of frames according to the present invention.

A linear interpolation method is described next with reference to FIG. 15. Referring to FIG. 15, the pixels Ga1, Ga2, Ga3 and so forth in the first vertical line (line 1) in frame Pa are read first, and the pixels Ga11, Ga12, Ga13 and so forth in the second vertical line (line 2) are read fourth. The data read for pixel Ga1 includes luminance value Ya1 and color value Ca1, and pixel Ga11 likewise includes luminance value Ya11 and color value Ca11. The new luminance value Ya1' is obtained by linear interpolation from the equation $$Ya1'=(Ya1+Ya11)/2.$$

This new luminance value Ya1' is substituted for the luminance value Ya1 in pixel Ga1 in the first vertical line. The new color value Ca1' is similarly acquired by the equation $$Ca1'=(Ca1+Ca11)/2.$$

This new color value Ca1' is substituted for the color value Ca1 in pixel Ga1 in the first vertical line.

This operation reduces distortion and blurring in moving subjects.

It is noted that the term moving subject used herein means a subject within a camera frame that is moving. The moving subject can be either a subject that is actually moving or a subject which is still but moving within the frame due to, e.g., by the movement of the camera.

By carrying out the calculation using every other pixel in a culling manner, it is possible to detect the moving subject in a shorter time.

Furthermore, by carrying out the calculation using every i other pixel (i is an integer) in a culling manner, it is possible to detect the moving subject in much shorter time.

Embodiment 2

Figure 3:
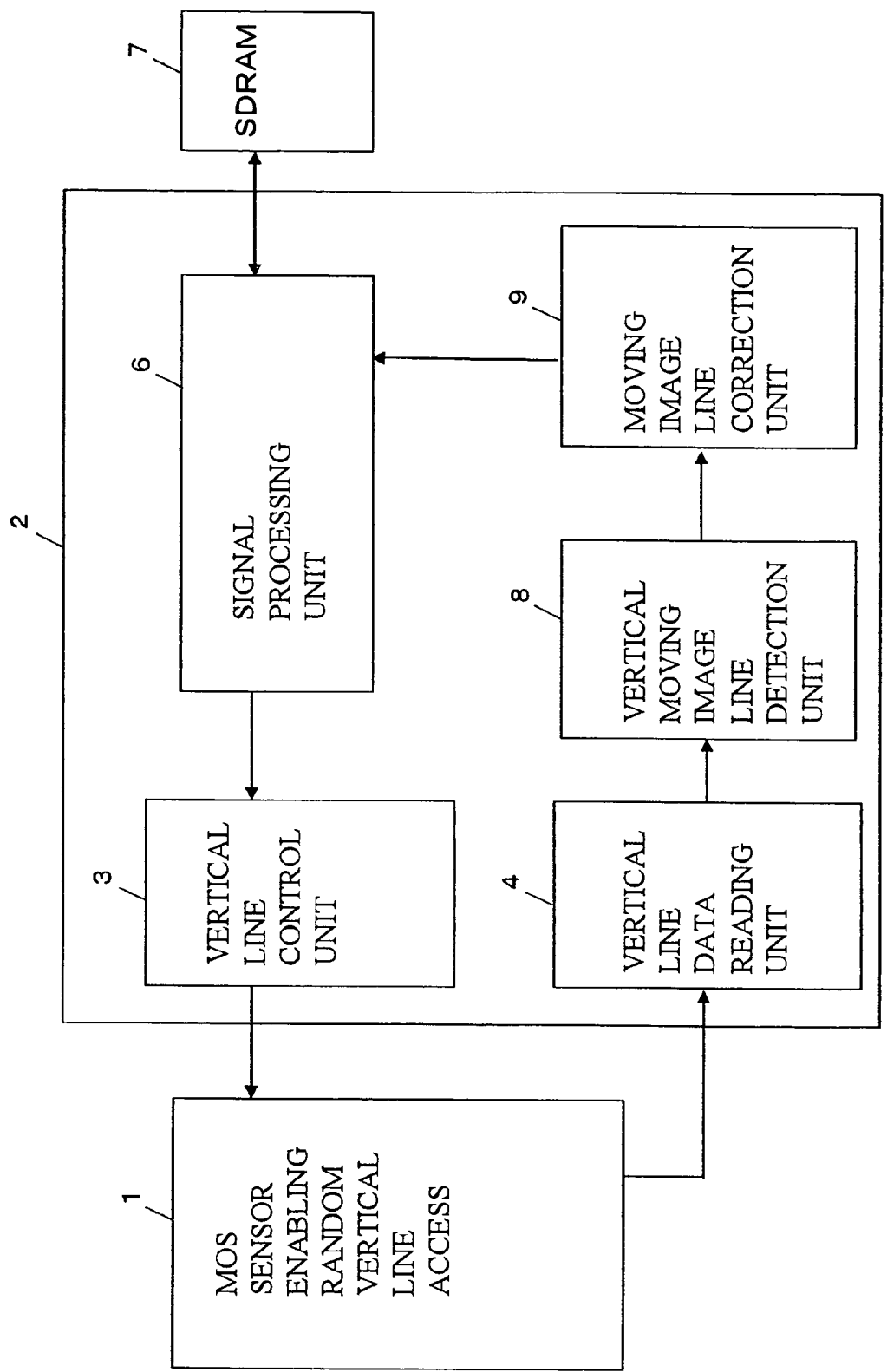
FIG. 3 is a block diagram of an imaging processor according to a second embodiment according to the present invention.

FIG. 3 is a block diagram of another preferred embodiment of the present invention. Imaging control according to this embodiment of the invention is described below with reference to use in a digital camera, the components of which are described below.

An image signal processing device according to this embodiment of the present invention has a MOS sensor 1 enabling random vertical access, a signal processing block 2, and SDRAM 7. The signal processing block 2 includes a vertical line control unit 3, vertical line data reading unit 4, vertical moving image line detection unit 8, moving image line correction unit 9, and signal processing unit 6.

The function of each part is described next.

The MOS sensor 1 enabling randomly accessing vertical lines (the random vertical line access MOS sensor of the claims, referred to below as simply MOS sensor 1) has a function for changing the MOS sensor 1 access sequence. The signal processing block 2 has a signal processing function for sequentially recording the read data. The vertical line control unit 3 has a function for controlling reading a desired vertical line. The vertical line data reading unit 4 has a function for reading the vertical line data specified by the vertical line control unit 3 from the MOS sensor 1. The vertical moving image line detection unit 8 has a function for detecting vertical lines containing part of a moving image (referred to below as vertical moving image lines). The moving image line correction unit 9 has a function for correcting interlacing in the moving image area. The SDRAM 7 temporarily stores the data from the signal processing unit 6, and is used as working memory for signal processing operations.

Operation of this embodiment is described next.

Figure 4:
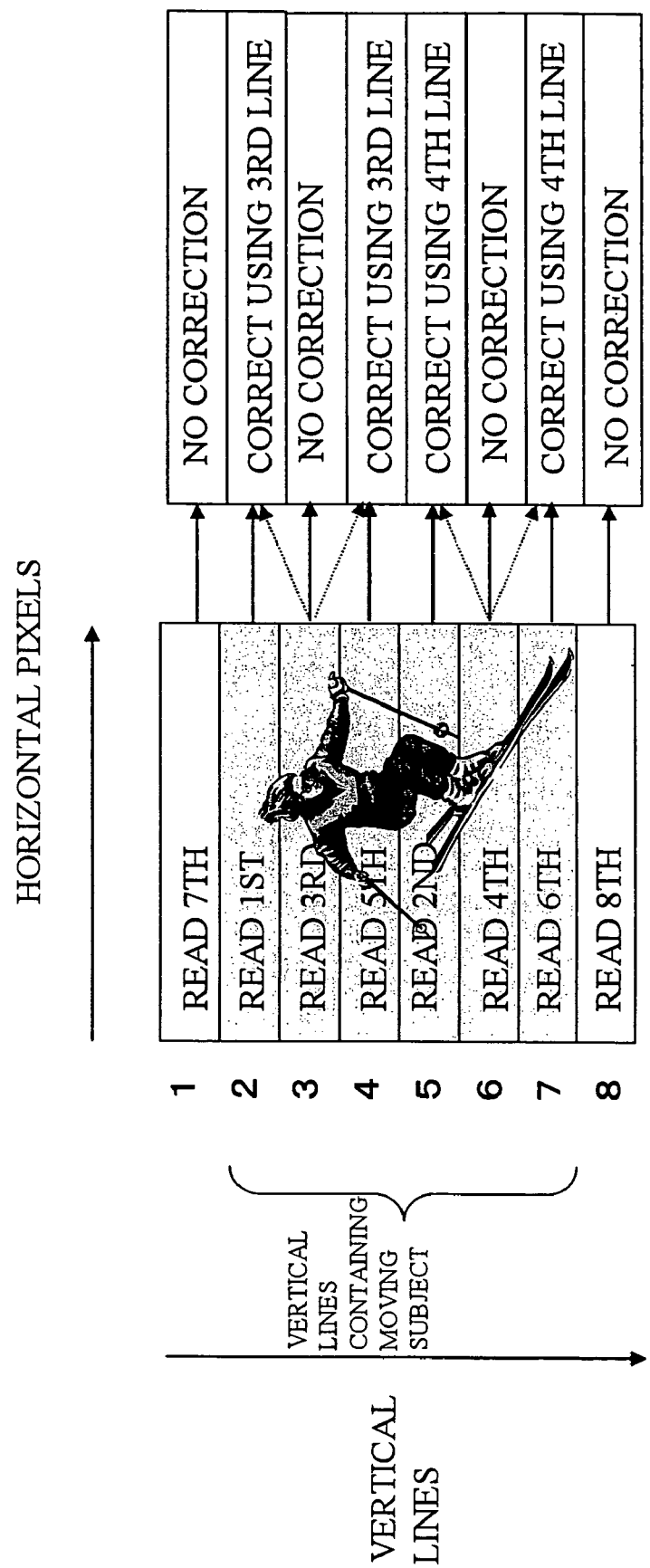
FIG. 4 describes the operation of an imaging process according to a second embodiment according to the present invention.

FIG. 4 describes the image correction process using the operating algorithm of this embodiment. The vertical moving image line detection unit 8 detects whether a moving subject (image) is on a particular vertical line. In this example the first to sixth read vertical lines are the vertical lines containing the moving subject.

The vertical moving image line detection unit 8 operates by determining the interframe difference between each vertical line while monitoring the scene before capturing a still image. When the average difference is greater than the moving-still image threshold value $\Delta 1$, the vertical moving image line detection unit 8 determines that a moving subject is present on that line. If the average difference is less than or equal to than the moving-still image threshold value $\Delta 1$, the vertical moving image line detection unit 8 determines that only a still image is on that line. The vertical lines on which a moving subject is present are read by applying this algorithm. The vertical moving image line detection unit 8 is further described below with reference to FIG. 15.

Referring to FIG. 15, the vertical moving image line detection unit 8 compares the corresponding vertical lines in current frame Pb and the previous frame Pa. The time difference $\Delta T$ between current frame Pb and previous frame Pa is 1/30 second, for example. The luminance and color values of pixels Gb1, Gb2, Gb3 in the first vertical line of current frame Pb are shown in Table 1 below.

TABLE 1

| Pixel | Gb1 | Gb2 | Gb3 |
|---|---|---|---|
| Luminance | Yb1 | Yb2 | Yb3 |
| Color | Cb1 | Cb2 | Cb3 |

The luminance and color values of pixels Ga1, Ga2, Ga3 in the first vertical line of previous frame Pa are shown in Table 2 below.

TABLE 2

| Pixel | Ga1 | Ga2 | Ga3 |
|---|---|---|---|
| Luminance | Ya1 | Ya2 | Ya3 |
| Color | Ca1 | Ca2 | Ca3 |

The line difference is acquired as the difference between luminance and color values as shown in Table 3.

TABLE 3

| Luminance difference | Ya1 – Yb1 | Ya2 – Yb2 | Ya3 – Yb3 |
|---|---|---|---|
| Color difference | Ca1 – Cb1 | Ca2 – Cb2 | Ca3 – Cb3 |

Note that these tables only show the values and differences for three pixels, but in practice the difference values are acquired for all pixels in every vertical line.

Whether the total difference $\Delta Y$ of all luminance difference values for the same scan line in two temporally adjacent frames is greater than threshold value $\Delta Y0$ is then determined. Additionally, whether the total difference $\Delta C$ of all color difference values for the same scan line in the same frames is greater than threshold value $\Delta C0$ is determined. If $$\Delta Y > \Delta Y0 \tag{1}$$

or $$\Delta C > \Delta C0 \tag{2}$$

that scan line is determined to contain part of a moving subject. The vertical lines containing any part of a moving subject are thus detected. If both equations (1) and (2) are true, that line is determined to contain a cluster of moving subjects. Multiple vertically adjacent vertical lines are usually detected as vertical lines containing part of a moving subject. The vertical lines detected to contain a moving subject are then read by skipping a specific number of vertical lines. This reading method is further described below.

The vertical line control unit 3 controls the sequence in which vertical lines are read from the MOS sensor 1 as follows. Line 2 is read first, the next two lines are then skipped and line 5 is read second. Next, line 3, which is directly below line 2, is read third, two lines are then skipped and line 6 is read fourth. Next, line 4 directly below line 3 is read fifth, and two lines are skipped and line 7 is read sixth. The read data is passed to the signal processing unit 6, and as shown in FIG. 4, the data in line 2 of the MOS sensor 1, which was read first, is corrected using the data in line 3, which was read third. The data in line 3 (read third) is not corrected. The data in line 4 (read fifth) is then corrected based on the data in line 3 (read third). The data in line 5 (read second) is corrected using the data in line 6 (read fourth). The data in line 6 (read fourth) is not corrected. The data in line 7 (read sixth) is corrected using the data from line 6 (read fourth).

Vertical line 1, which contains only still image, is then read seventh, and vertical line 8 is read eighth. By thus applying this interlacing process every third line, the signal processing unit 6 applies image correction using data from alternating vertical lines.

Figure 5:
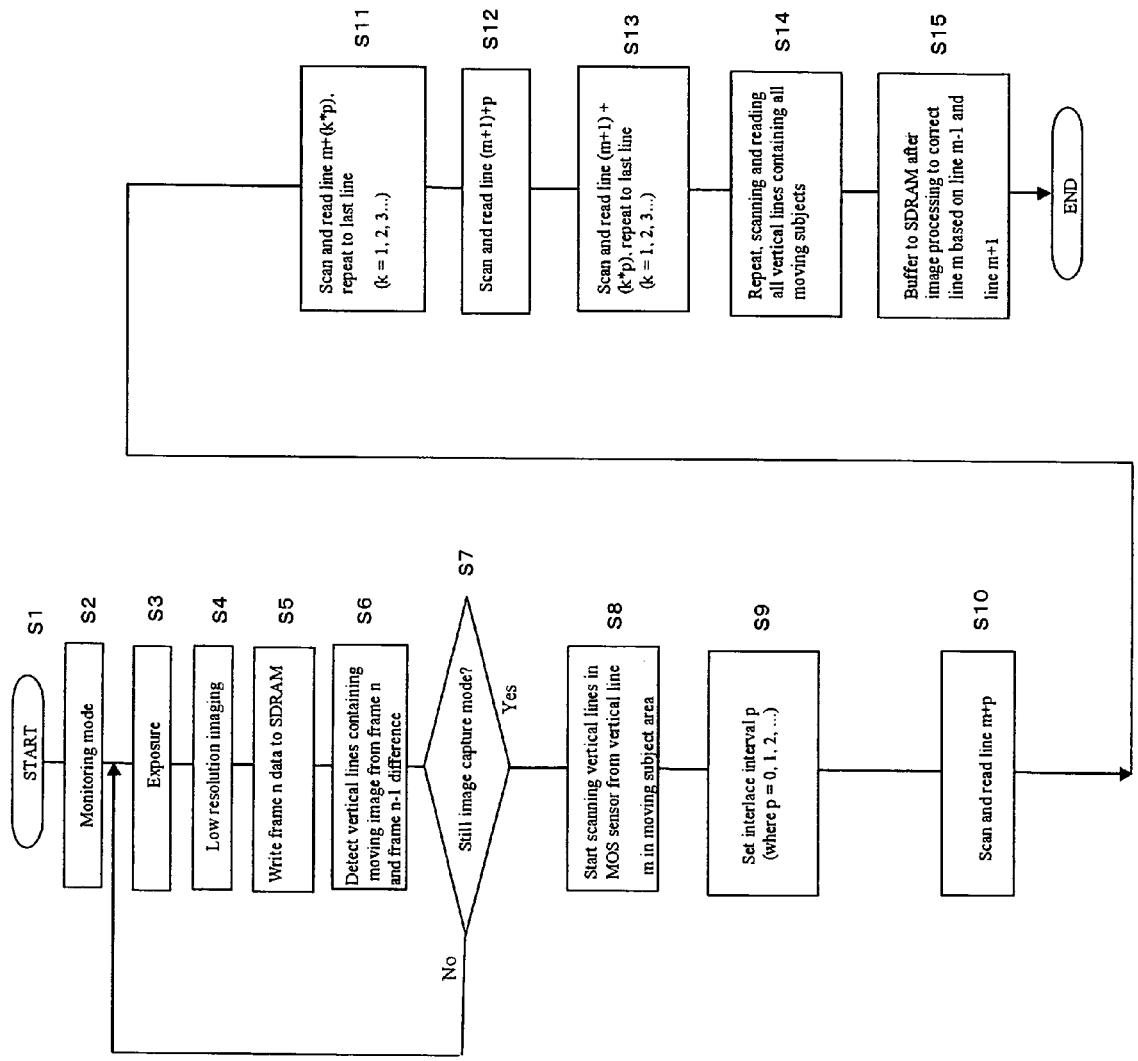
FIG. 5 is a flow chart of the control algorithm of an imaging process according to a second embodiment according to the present invention.

FIG. 5 is a flow chart describing the computing algorithm showing the operation of this embodiment of the invention. This flow chart describes the general selection of lines containing a moving subject and three-line interpolation.

In the monitor mode (S2) before capturing a still image, the exposure is monitored continuously at low resolution (S3, S4), and the data is written temporarily to SDRAM (S5). The vertical lines containing a moving subject component are detected based on the difference between corresponding vertical lines in frame n and frame n−1 (S6). When the still image capture mode is entered (S7), the scanning sequence of vertical lines from the MOS sensor 1 starts at vertical line m in the moving subject area (S8). Scanning and reading then skips to vertical line m+p (S10). If the subject is moving quickly, interlaced scanning uses a interlacing (line skipping) width p of 3 or 4 lines, but if the subject is moving slowly, the interlacing width p is 1 or 2 lines (S9). When the movement is fast, distortion of the moving subject can be reduced by reading and correcting vertical lines with a small time difference therebetween.

Figure 6:
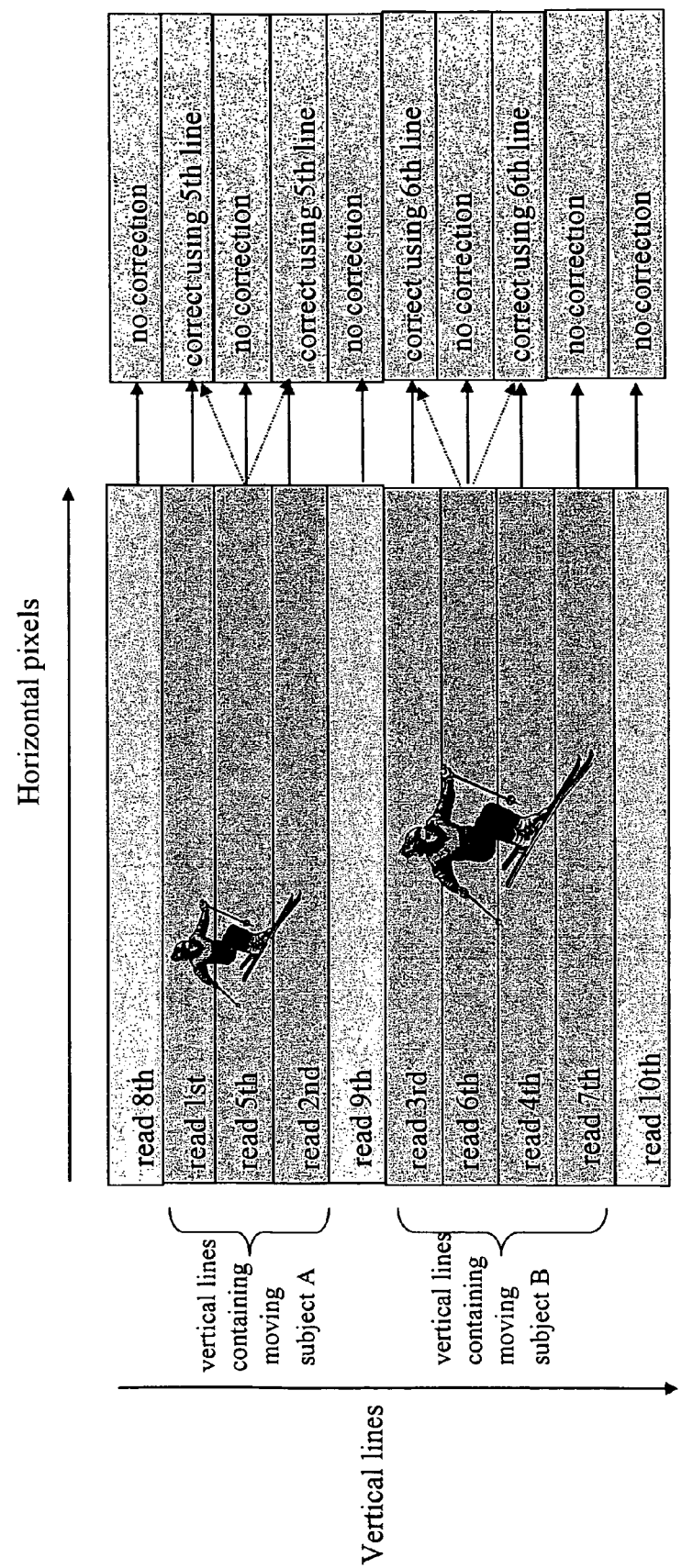
FIG. 6 describes an imaging process (showing plural vertical lines of a moving subject) according to a second embodiment according to the present invention.

When moving subjects are present in multiple vertical line groups as shown in FIG. 6, the vertical lines containing the moving subjects are scanned first, and the vertical lines not containing a moving subject are scanned next. The vertical lines containing a moving subject can thus be read in a shorter time, and distortion of the moving subject can be reduced.

After sequentially scanning lines m+(k*p) (where k=1, 2, 3, . . . ) to the bottom vertical line in the moving subject area (S11), scanning returns to continue from the skipped line (m+1)+p (S12). Scanning then repeats sequentially at line m+1(k*p) (where k=1, 2, 3, . . . ) (S14). This process repeats to scan all vertical lines containing a moving subject. The unscanned vertical lines not containing a moving subject are sequentially scanned next. The data read from each vertical line is buffered to SDRAM 7, and line m is corrected using the data from line m−1 and line m+1 (S15).

When the moving subjects are separated in to vertical line groups as shown in FIG. 6, moving subject line group A and moving subject line group B are read continuously, and the lines not containing a moving subject are read last. Distortion and blurring i the two vertical line groups can be reduced by signal processing to correct interlacing.

Linear interpolation, cubic interpolation, or bilinear interpolation can be used as the correction method.

This operation reduces distortion and blurring in moving subjects.

Embodiment 3

Figure 7:
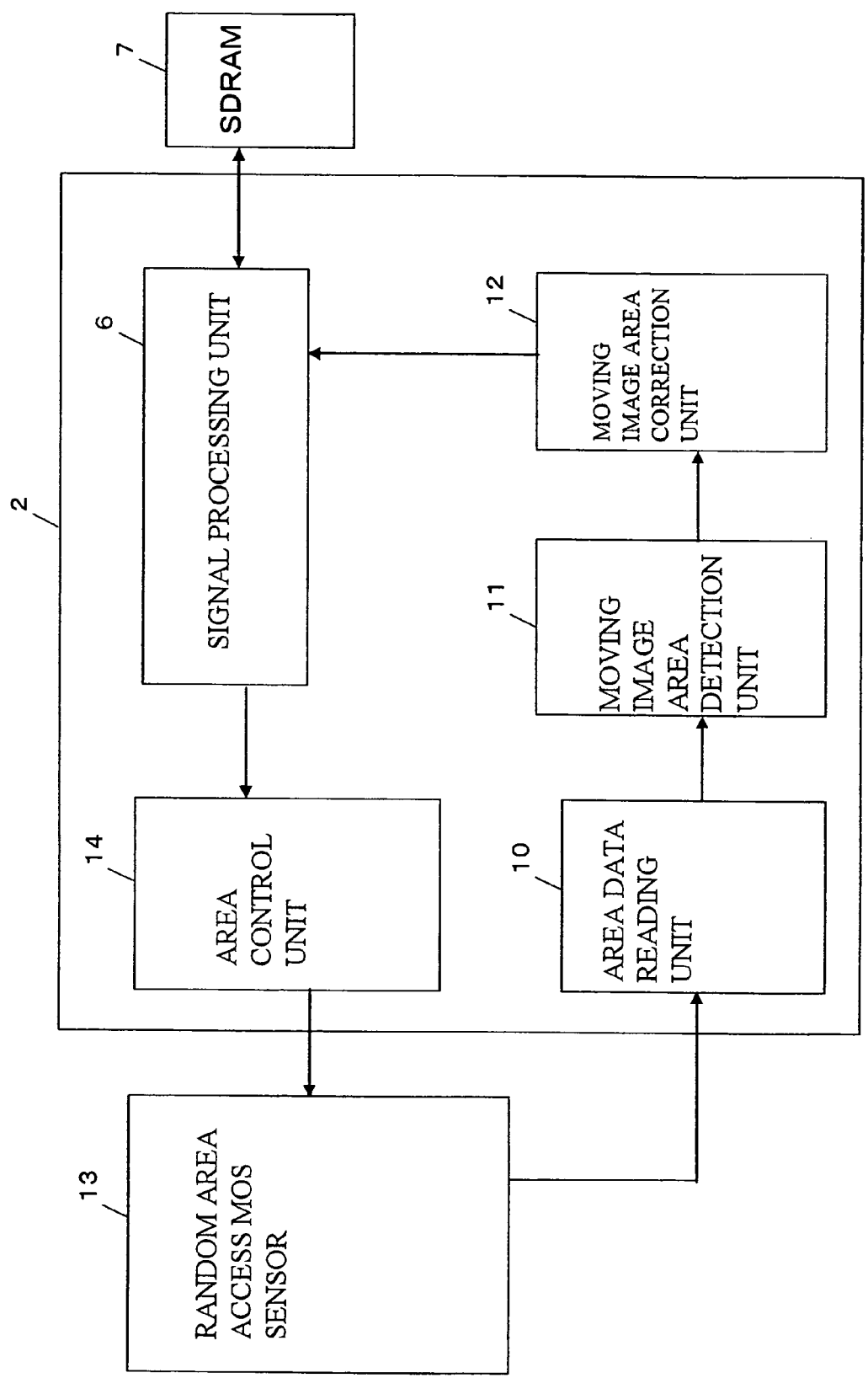
FIG. 7 is a block diagram of an imaging processor according to a third embodiment according to the present invention.

FIG. 7 is a block diagram of another preferred embodiment of the present invention. Imaging control according to this embodiment of the invention is described below with reference to use in a digital camera, the components of which are described below.

An image signal processing device according to this embodiment of the present invention has a MOS sensor 13 enabling random area access, a signal processing block 2, and SDRAM 7. The signal processing block 2 includes an area control unit 14, an area data reading unit 10, a moving image area detection unit 11, a moving image area correction unit 12, and a signal processing unit 6.

The function of each part is described next.

The random area access MOS sensor 13 has a function for changing the MOS sensor access sequence. The signal processing block 2 has a signal processing function for sequentially recording the read data. The area control unit 14 has a function for controlling reading a desired area. The area data reading unit 10 has a function for reading area data from the area in the random area access MOS sensor 13 specified by the area control unit 14. The moving image area detection unit 11 has a function for detecting areas containing a moving subject. The moving image area correction unit 12 has a function for correcting the moving subject area. The SDRAM 7 temporarily stores the data from the signal processing unit 6, and is used as working memory for signal processing operations.

Operation of this embodiment is described next.

Figure 8:
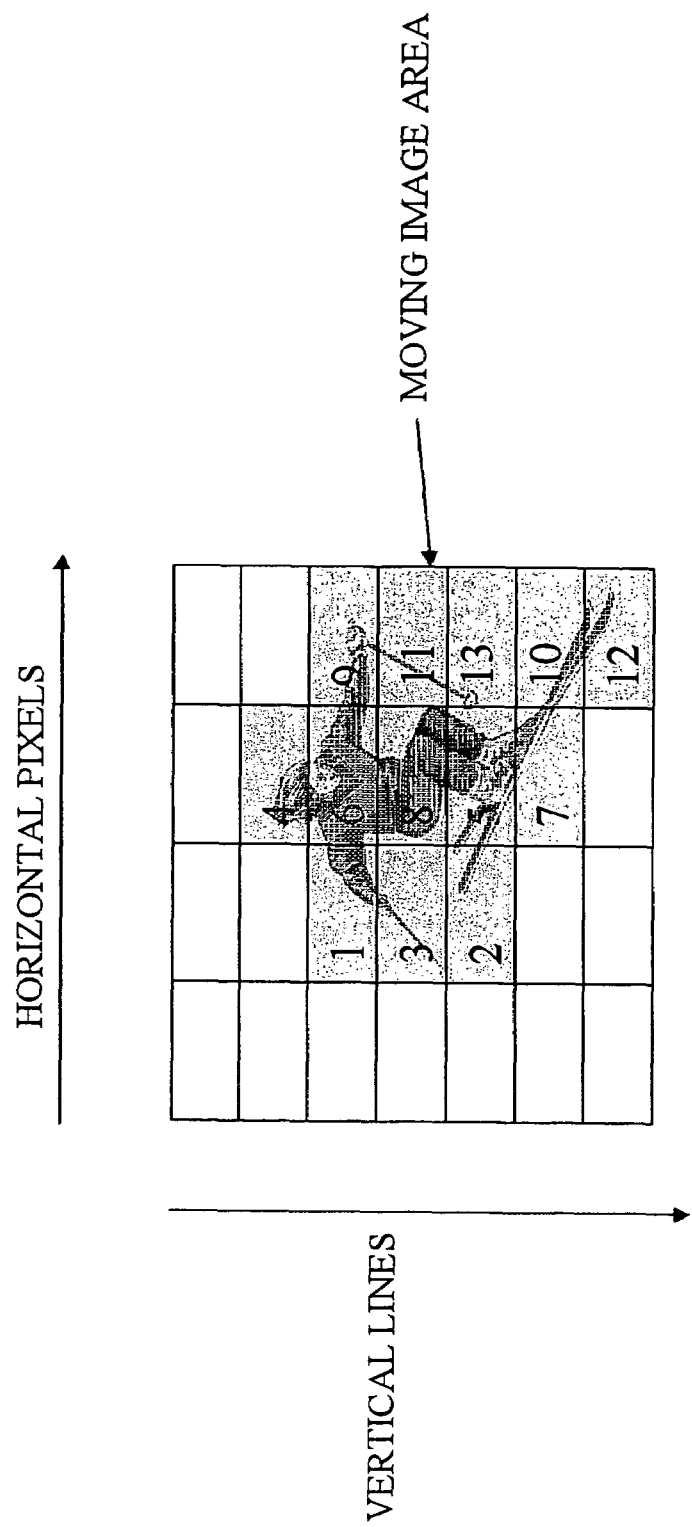
FIG. 8 describes the operation of an imaging process according to a third embodiment according to the present invention.

FIG. 8 describes the image correction process using the operating algorithm of this embodiment.

The moving image area detection unit 11 detects the image area containing a moving subject. In this example the moving subject is detected in areas 1 to 12.

During monitoring before capturing a still image, the moving image area detection unit 11 detects the interframe difference between the defined areas. When the average difference is greater than the moving-still image threshold value $\Delta 2$, the moving image area detection unit 11 determines that a moving subject is present in that area. If the average difference is less than or equal to than the moving-still image threshold value $\Delta 2$, the moving image area detection unit 11 determines that only a still image is in that area. The areas in which a moving subject is present are read by applying this algorithm. The differences are calculated pixel by pixel using equations (1) and (2) above.

The area control unit 14 controls the sequence in which areas are read from the random area access MOS sensor 13 as follows.

Area 1 is read first, then one area is skipped and area 2 is read, and then area 3 directly below area 1 is read. Next, area 4 is read, two areas are skipped and area 5 is read, then area 6 directly below area 4 is read, two areas are skipped and area 7 is read, and then area 8 directly below area 6 is read. Next, area 9 is read, two areas are skipped and area 10 is read, area 11 directly below area 9 is then read, two areas are skipped and area 12 is read, and then area 13 directly below area 11 is read.

The read data is passed to the signal processing unit 6, in which the data from area 1 in the MOS sensor is corrected using the data from area 3. Area 3 is not corrected. Area 2 is corrected using the data from area 3. The data in area 4 is corrected using the data from area 6. Area 6 is not corrected. The data in area 8 is corrected using the data from area 6. The data in area 5 is corrected using the data from area 7. Area 7 is not corrected. The data in area 9 is corrected using the data from area 11. Area 11 is not corrected. The data in area 13 is corrected using the data from area 11. The data in area 10 is corrected using the data from area 12. Area 12 is not corrected.

The area containing only a still image is then read.

By thus interlacing every third line, the signal processing unit 6 applies signal correction using data in alternately successive areas.

Figure 9:
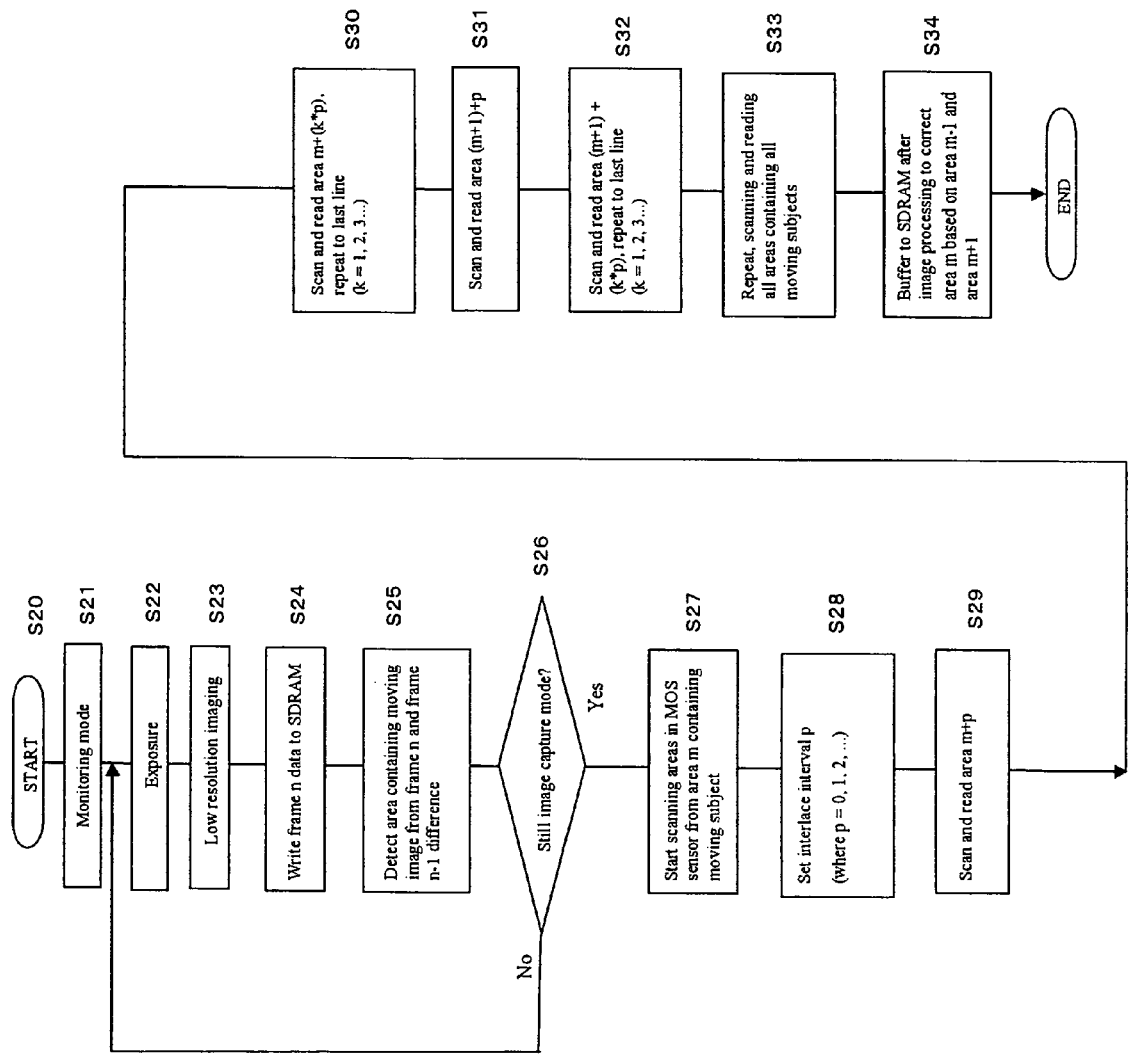
FIG. 9 is a flow chart of the control algorithm of an imaging process according to a third embodiment according to the present invention.

FIG. 9 is a flow chart describing the computing algorithm showing the operation of this embodiment of the invention. This flow chart describes the general selection of lines containing a moving subject and interpolating two-line areas.

In the monitor mode (S20) before capturing a still image, the exposure is monitored continuously at low resolution (S22, S23), and the data is written temporarily to SDRAM (S24). The areas containing a moving subject are detected based on the difference between corresponding vertical lines in frame n and frame n−1 (S25).

When the still image capture mode is entered (S26), the scanning sequence of areas in the MOS sensor 1 starts at area m containing a moving subject (S27). Scanning and reading then skips to area m+p (S29). If the subject is moving quickly, interlaced scanning uses a wide interlacing distance p of 3 or 4, but if the subject is moving slowly, the interlacing distance p is 1 or 2 areas (S28). When the movement is fast, distortion of the moving subject can be reduced by reading and correcting areas with a small time difference therebetween.

Figure 10:
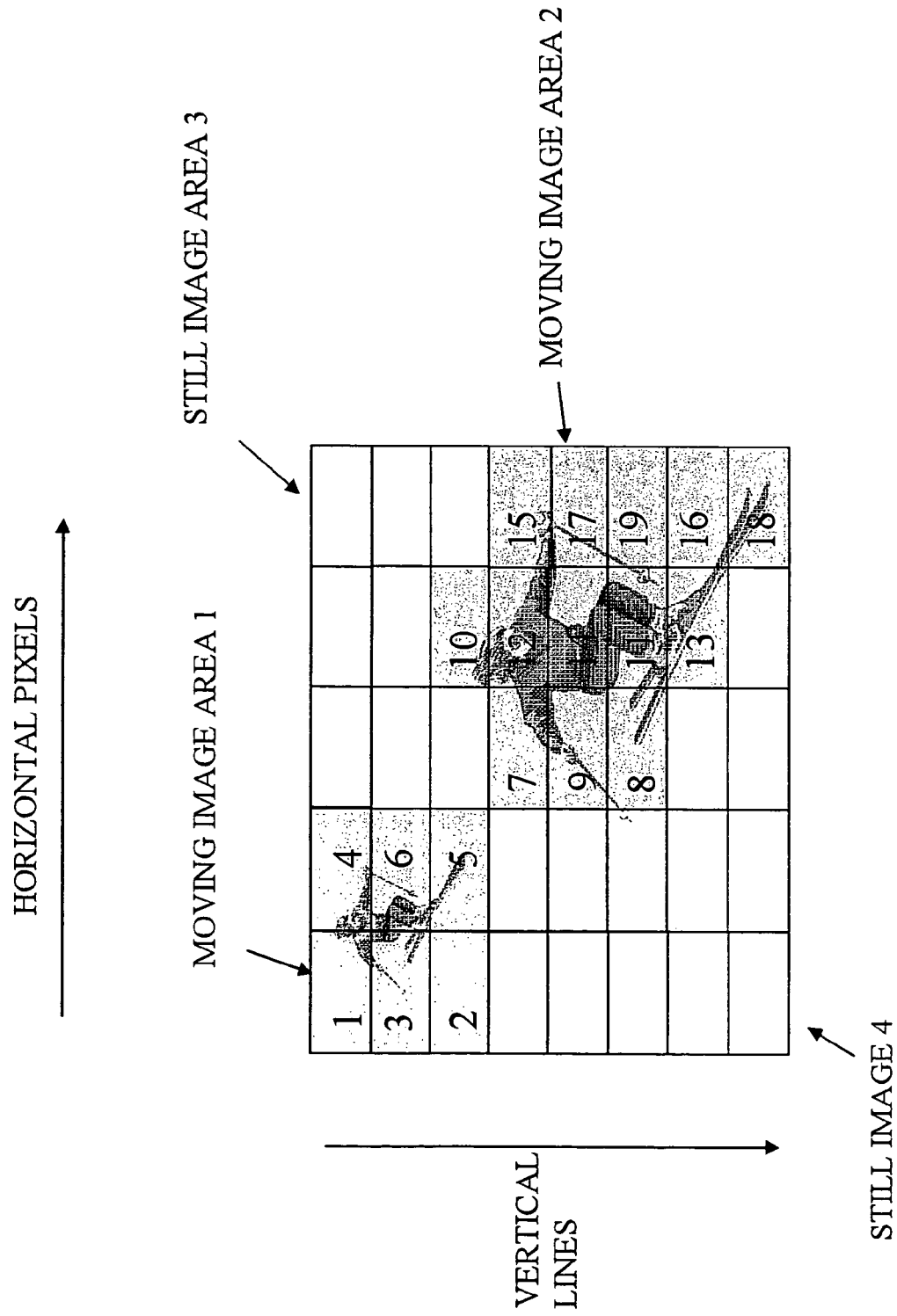
FIG. 10 describes an imaging process (showing moving subjects in plural areas) according to a second embodiment according to the present invention.

When moving subjects are present in multiple areas as shown in FIG. 10, the areas containing the moving subjects are scanned first, and the areas not containing a moving subject are scanned next. The areas containing a moving subject can thus be read in a shorter time, and distortion of the moving subject can be reduced.

After sequentially scanning lines m+(k*p) (where k=1, 2, 3, . . . ) to the bottom area containing a moving subject (S11), scanning returns to continue from the skipped line (m+1)+p (S29). Scanning then repeats sequentially at line m+1(k*p) (where k=1, 2, 3, . . . ) (S32). This process repeats to scan all areas containing a moving subject (S33). The unscanned areas not containing a moving subject are sequentially scanned next. The data read from each vertical line is buffered to SDRAM 7, and line m is corrected using the data from line m−1 and line m+1 (S33).

Linear interpolation, cubic interpolation, or bilinear interpolation can be used as the correction method.

This operation reduces distortion and blurring in moving subjects.

Embodiment 4

Figure 11:
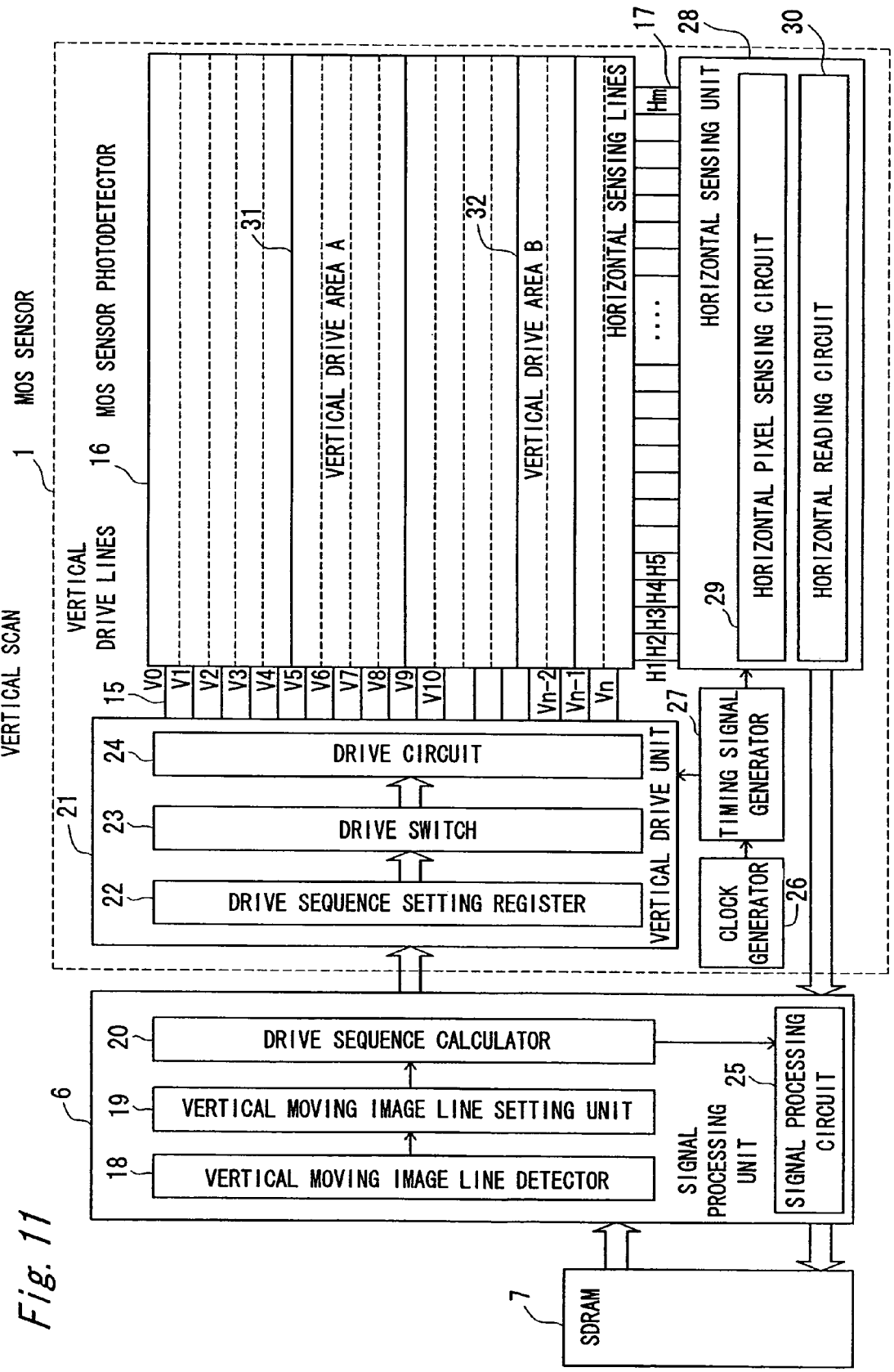
FIG. 11 is a function block diagram of an imaging processor according to a fourth embodiment according to the present invention.

FIG. 11 is a block diagram of another preferred embodiment of the present invention. Imaging control according to this embodiment of the invention is described below with reference to use in a digital camera, the components of which are described below.

This embodiment of the invention applies vertical moving image line and vertical area drive.

An image signal processing device according to this embodiment of the present invention has a random vertical area access MOS sensor 1 internally comprising a drive sequence setting register 22, drive switch 23, drive circuit 24, vertical drive lines 15, MOS sensor photodetector 16, horizontal sensing unit 28, horizontal sensing lines 17, clock generator 26, and timing signal generator 27.

The horizontal sensing unit 28 has a horizontal pixel sensing circuit 29 and horizontal reading circuit 30.

The signal processing unit 6 has a vertical moving image line detector 18, vertical moving image line setting unit 19, drive sequence calculator 20, and signal processing circuit 25. SDRAM 7 is connected to the signal processing unit 6.

The function of each part is described next.

When the difference between a vertical line or vertical area in frame n−1 and frame n−2 stored temporarily in the SDRAM 7 is greater than or equal to a threshold value, the vertical moving image line detector 18 detects that line or area to be a vertical moving image line. The vertical moving image line setting unit 19 sets the vertical lines in current frame processed as moving image lines and the vertical lines processed as still image lines.

The clock generator 26 has a function for supplying a MOS sensor clock. The timing signal generator 27 has a function for supplying the vertical drive timing and the horizontal sense timing to the vertical drive unit 21 and horizontal sensing unit 28.

The horizontal pixel sensing circuit 29 has a sensing function for selecting horizontal pixels. The horizontal reading circuit 30 has a function for reading the sensed pixels. The signal processing circuit 25 of the signal processing unit 6 has a function for signal processing the horizontal pixels of the vertical line.

Operation of this embodiment is described next.

The vertical moving image line detector 18 calculates the difference for each pixel in the same vertical lines in frames n−1 and n−2 (where frame n is the current frame) stored temporarily in SDRAM 7. If the average difference of all pixels in the line is greater than or equal to threshold value Δ, that vertical line is determined to be a vertical line containing a moving image. The vertical moving image line setting unit 19 sets the vertical moving image lines. When a vertical area, such as vertical drive area A 31, is set, vertical drive lines V5, V6, V7, and V8 are set. If a plurality of vertical areas are set, such as vertical drive area A 31 and vertical drive area B 32, vertical drive lines V5, V6, V7, V8, Vn−2 and Vn−1, are set as vertical moving image lines.

When the vertical moving image line detector 18 detects that image movement is quick, the drive sequence calculator 20 sets a high drive interlacing value k, such as k=3, 4, 5, . . . ; conversely when movement is slow, k is set low, such as k=1 or 2. Furthermore, when there are multiple areas containing a moving image, such as vertical drive area A 31 and vertical drive area B 32, the interlace value k is set and vertical drive area A 31 and vertical drive area B 32 are read as a single vertical drive area.

For example, if k=1, the vertical lines containing a moving image are driven in the sequence V5, V7, Vn−2, V6, V8, Vn−1. Lines V0, V1, V2 . . . are then read.

The vertical drive unit 21 temporarily stores the drive sequence in the drive sequence setting register 22. The drive switch 23 switches the driven vertical lines according to the drive sequence using the timing signal generator 27. The drive circuit 24 drives the vertical lines as controlled by the timing signal generator 27.

The photoelectric charge of each horizontal pixel in the driven vertical line is converted to a voltage, and the voltage of the pixel sensed by the horizontal pixel sensing circuit 29 is passed through the horizontal sensing line 17 to the horizontal reading circuit 30. Data is sent from the horizontal reading circuit 30 to the signal processing circuit 25 and buffered to SDRAM 7. The signal processing circuit 25 assigns addresses in SDRAM 7 uniformly to manage what data belongs to which horizontal pixel in which vertical drive line.

Distortion of moving images can thus be reduced by horizontally sensing the vertical drive areas.

Embodiment 5

Figure 12:
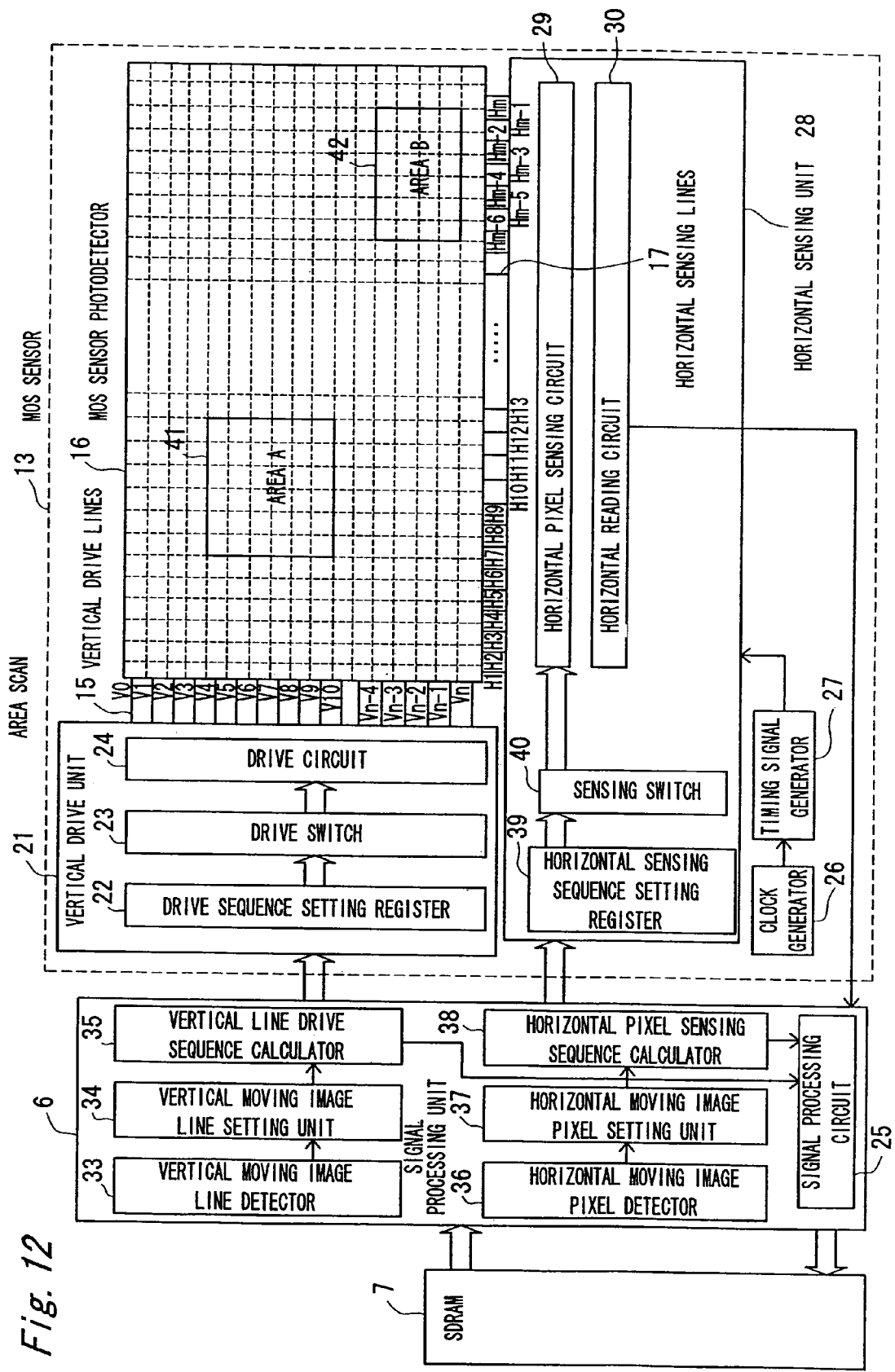
FIG. 12 is a function block diagram of an imaging processor according to a fifth embodiment according to the present invention.
Figure 13:
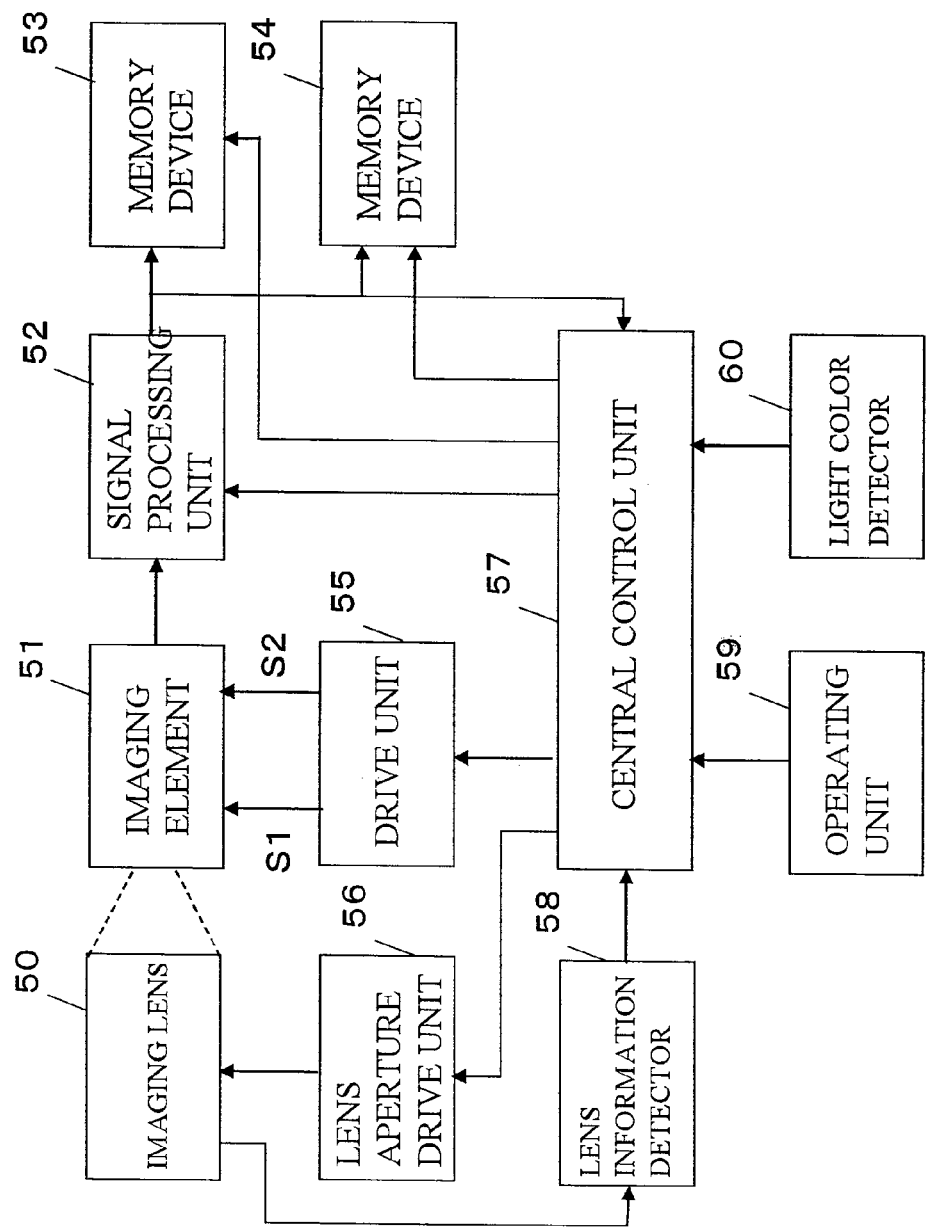
FIG. 13 is a block diagram of an imaging processor according to the prior art.
Figure 14:
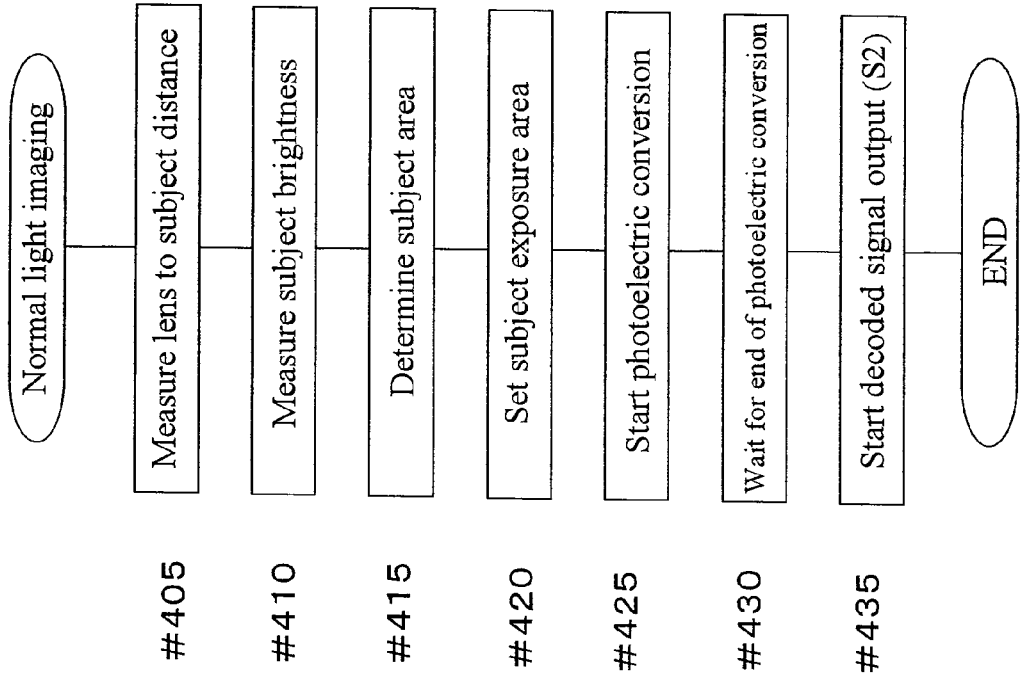
FIG. 14 is a flow chart of an imaging process according to the prior art.

FIG. 12 is a block diagram of another preferred embodiment of the present invention. Imaging control according to this embodiment of the invention is described below with reference to use in a digital camera, the components of which are described below.

An image signal processing device according to this embodiment of the present invention has a MOS sensor 13 enabling random vertical line and horizontal pixel access internally comprising a vertical line drive sequence setting register 22, drive switch 23, drive circuit 24, vertical drive lines 15, MOS sensor photodetector 16, horizontal sensing unit 28, clock generator 26, and timing signal generator 27.

The horizontal sensing unit 28 has a horizontal pixel sensing circuit 29, horizontal reading circuit 30, horizontal sensing lines 17, horizontal sensing sequence setting register 39, and sensing switch 40.

The signal processing unit 6 has a vertical moving image area detector 33, vertical moving image area setting unit 34, vertical line driving sequence calculator 35, horizontal moving image pixel detector 36, horizontal moving image pixel setting unit 37, horizontal pixel sensing sequence calculator 38, and signal processing circuit 25. SDRAM 7 is connected to the signal processing unit 6.

The function of each part is described next.

The vertical moving image area detector 33 compares the difference between each vertical line in frame n−2 and frame n−1 (where frame n is the current frame) buffered to SDRAM 7 with a threshold value, and if the difference is greater than or equal to the threshold value, detects that line as a vertical moving image line. The vertical moving image area setting unit 34 sets the vertical lines in the current frame to be processed as containing a moving image and the vertical lines to be processed as containing only a still image. The vertical drive unit has the same function as in the fourth embodiment, and further description is thus omitted below.

The horizontal moving image pixel detector 36 compares the difference between each horizontal pixel in frame n−2 and frame n−1 stored in the SDRAM 7 with a threshold value, and if the difference is greater than or equal to the threshold value, detects that pixel as a horizontal moving image pixel. The horizontal moving image pixel setting unit 37 sets the horizontal pixels in the current frame to be processed as a moving image pixel and the pixels to be processed as still image pixels.

The clock generator 26 has a function for supplying a MOS sensor clock. The timing signal generator 27 has a function for supplying the vertical drive timing and the horizontal sense timing to the vertical drive unit 21 and horizontal sensing unit 28.

The horizontal sensing sequence setting register 39 sets the horizontal sensing sequence in a register in response to a horizontal pixel sensing sequence calculation command. The sensing switch 40 applies the horizontal pixel sensing command and read sequence command to the horizontal pixel sensing circuit 29.

The horizontal pixel sensing circuit 29 has a sensing function for selecting horizontal pixels. The horizontal reading circuit 30 has a function for reading the sensed pixels. The signal processing circuit 25 of the signal processing unit 6 has a function for signal processing the horizontal pixels of the vertical line.

Operation of this embodiment is described next.

The vertical moving image area detector 33 obtains the difference between each pixel in each vertical line in frame n−2 and frame n−1 (where frame n is the current frame) buffered to SDRAM 7, and compares the average pixel difference with a threshold value Δ. If the average difference is greater than or equal to the threshold value, the vertical moving image area detector 33 detects that line as a vertical moving image line.

The horizontal moving image pixel detector 36 calculates the difference between each horizontal pixel in frame n−2 and frame n−1 stored in the SDRAM 7 and compared the average pixel difference with a threshold value Δ. If the average pixel difference is greater than or equal to the threshold value, the horizontal moving image pixel detector 36 detects that pixel as a horizontal moving image pixel.

The vertical moving image area setting unit 34 sets the vertical moving image lines. If one vertical drive area, such as vertical drive area A 41, is set, the vertical moving image area setting unit 34 also sets vertical drive lines V4, V5, V6, V7, V8, V9. If a plurality of vertical drive areas, such as vertical drive area A 41 and vertical drive area B 42, are set, the vertical moving image area setting unit 34 sets vertical drive lines V4, V5, V6, V7, V8, V9, Vn−4, Vn−3, Vn−2, Vn−1 as the vertical moving image lines. The horizontal moving image pixel setting unit 37 sets the horizontal pixels in the current frame to be processed as a moving image pixel and the pixels to be processed as still image pixels. If one horizontal drive area, such as horizontal drive area A 41, is set, the horizontal moving image pixel setting unit 37 also sets horizontal sensing lines H7, H8, H9, H10 H11, H12. If a plurality of horizontal drive areas, such as horizontal drive area A 41 and horizontal drive area B 42, are set, the horizontal moving image pixel setting unit 37 also sets horizontal sensing lines H7, H8, H9, H10 H11, H12, and Hm−6, Hm−5, Hm−4, Hm−3, Hm−2, Hm−1, Hm as the horizontal moving image pixels.

When the vertical moving image area detector 33 detects that image movement is quick, the drive sequence calculator 35 sets a high drive interlacing value k, such as k=3, 4, 5, . . . ; conversely when movement is slow, k is set low, such as k=1 or 2. Furthermore, when there are multiple areas containing a moving image, such as vertical drive area A 41 and vertical drive area B 42, the interlace value k is set and vertical drive area A 41 and vertical drive area B 42 are read as a single vertical drive area.

For example, if k=1, the vertical lines containing a moving image are driven in the sequence V4, V6, V8, Vn−3, Vn−1, V5, V7, V9, Vn−2, Vn. Lines V0, V1, V2 . . . are then read.

The vertical drive unit 21 temporarily stores the drive sequence in the drive sequence setting register 22. The drive switch 23 switches the driven vertical lines according to the drive sequence using the timing signal generator 27. The drive circuit 24 drives the vertical lines as controlled by the timing signal generator 27.

Likewise, the horizontal sensing unit 28 temporarily stores the sensing sequence in the horizontal sensing sequence setting register 39. The sensing switch 40 changes the horizontal line being sensed according to the sensing sequence at the timing controlled by the timing signal generator 27. The horizontal pixel sensing circuit 29 drives the horizontal lines according to the timing signal generator 27.

The photoelectric charge of each sensed horizontal pixel is converted to a voltage, and is applied through the horizontal sensing line 17 to the horizontal reading circuit 30. Data is sent from the horizontal reading circuit 30 to the signal processing circuit 25 and buffered to SDRAM 7. The signal processing circuit 25 assigns addresses in SDRAM 7 uniformly to manage what data belongs to which horizontal pixel in which vertical drive line. Distortion of moving images can thus be reduced by horizontally sensing the vertical drive areas.

APPLICATIONS IN INDUSTRY

The present invention can be used in all electronic devices using a MOS sensor for any application, provides a means for reducing distortion of moving images while maintaining a high dynamic range with a simple configuration. Potential applications and uses are expected to continue growing.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An image signal processing device comprising:
   an image sensor;
   a vertical line control unit operable to control a vertical line access in said image sensor;
   a signal processing unit operable to specify an access sequence to said vertical line control unit;
   a vertical line data reading unit operable to read vertical line data from said image sensor;
   a vertical moving subject line detection unit operable to detect vertical lines containing moving subject data from the vertical line data read from said vertical line data reading unit; and
   a vertical line correction unit operable to correct the detected vertical lines containing the moving subject data using the vertical line data from among other detected vertical lines containing the moving subject data.

2. An image signal processing device as described in claim 1, wherein said vertical line control unit is operable to select every M-th vertical line, where M is a positive integer.

3. An image signal processing device as described in claim 1, wherein when a plurality of moving subjects are present in a scene and a plurality of vertical line groups containing the plurality of moving subjects are present in the scene, said vertical line control unit is operable to first read the vertical line groups containing the plurality of moving subjects, and then read the vertical line groups not containing the plurality of moving subjects.

4. An image signal processing device as described in claim 1, wherein said image sensor is a MOS image sensor.

5. An image signal processing device as described in claim 1, wherein said vertical line control unit is operable to change the vertical line read sequence within an area.

* * * * *